United States Patent [19]
O'Donnell

[11] Patent Number: 4,815,010
[45] Date of Patent: Mar. 21, 1989

[54] VIRTUAL MEMORY IMAGE CONTROLLER FOR MULTI-WINDOWING

[76] Inventor: Ciaran O'Donnell, 30, rue de la Martinière, 91570 Bievres, France

[21] Appl. No.: 862,780

[22] Filed: May 13, 1986

[30] Foreign Application Priority Data

May 15, 1985 [FR] France ................................ 85 07412

[51] Int. Cl.⁴ ................................................ G06F 3/14
[52] U.S. Cl. ...................................... 364/521; 340/747
[58] Field of Search ... 364/200 MS File, 900 MS File, 364/518, 521, 523; 358/160; 340/723, 724, 726, 734, 747, 721

[56] References Cited

U.S. PATENT DOCUMENTS 4,407,016 9/1983 Bayliss et al. ........................ 364/200
4,555,775 11/1985 Pike ........................................ 364/900
4,558,413 12/1985 Schmidt et al. ...................... 364/300
4,570,181 2/1986 Yamamura ......................... 358/160
4,598,384 7/1986 Shaw et al. .......................... 364/900
4,642,790 2/1987 Minshull et al. ..................... 364/900
4,658,351 4/1987 Teng .................................. 364/200

*Primary Examiner*—Gary V. Harkcom
*Assistant Examiner*—Randy W. LaCasse
*Attorney, Agent, or Firm*—Nutter, McClennen & Fish

[57] ABSTRACT

A virtual memory image controller for multi-windowing, comprises a bidimensional image memory organized in N elementary blocks, N being an integer, the blocks being of fixed size and rectangular, a random access read/write memory containing a sequence of N pointers, each pointer noting the beginning address of a block in the image memory, a video signal generator delivering a video signal corresponding to the contents of n blocks of the image memory, NSN, for the display on a screen of the image composed of n blocks organized in amatrix, the blocks be ing addressed by the video generator via a table of indirection, an interface for read/write accesses to the image memory, the accesses being made via the indirection table, the controller comprising also a data bus, an address bus, a command bus, and a sequencer.

6 Claims, 4 Drawing Sheets

Figure 1:
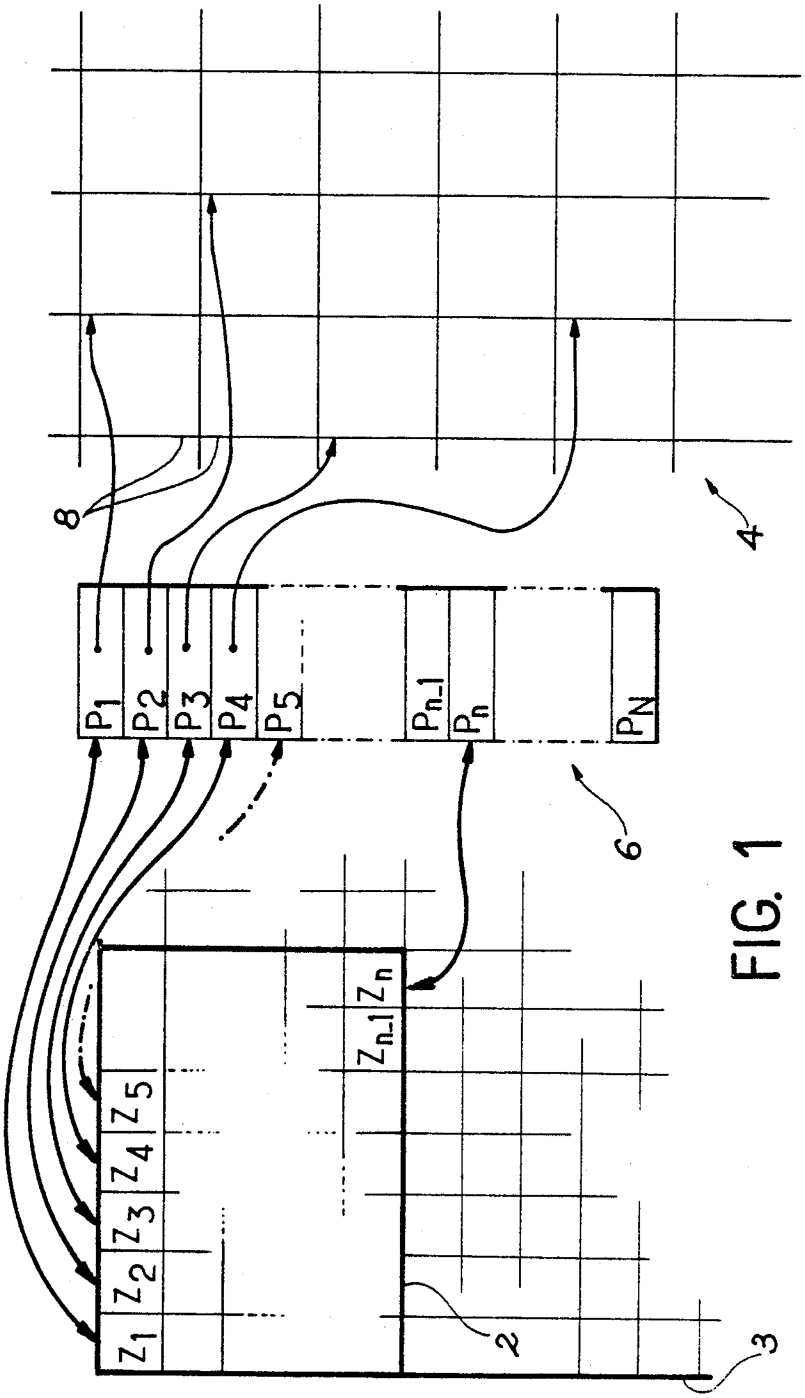

FIG. 4a
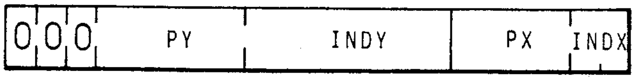
FIG. 4b
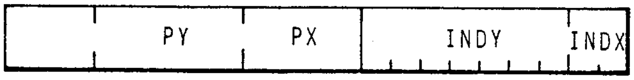
FIG. 4c
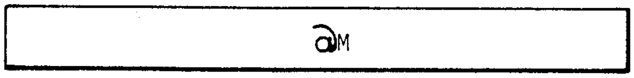
FIG. 5a
FIG. 5b
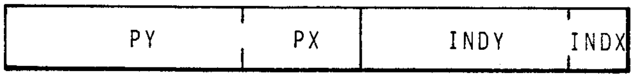
FIG. 5c
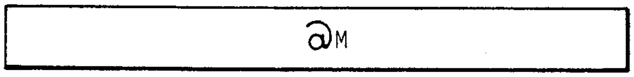
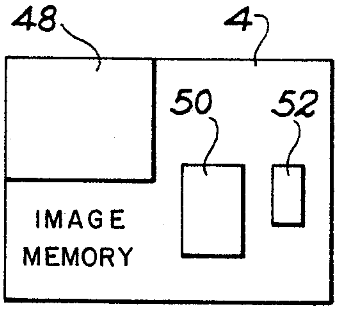
FIG. 6a
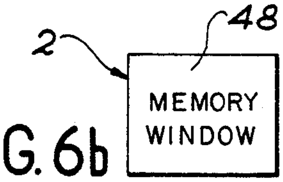
FIG. 6b
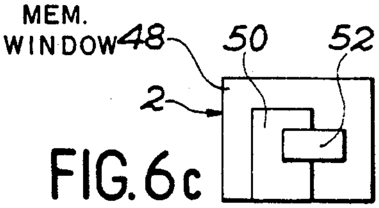
FIG. 6c

VIRTUAL MEMORY IMAGE CONTROLLER FOR MULTI-WINDOWING

The present invention relates to a virtual memory image controller for overlapping windows. The circuit of the invention is associated with a point addressable screen (raster screen or bitmap screen) using a two-dimensional coordinate system.

The circuit of the invention comprises a bidimensional image memory addressed according to a co-ordinate system similar to that used for addressing the screen. This memory has a size that is superior to the size of the screen. It can hence memorize a plurality of images of which only a few are visualized, totally or partially, at a given moment.

An image is visualized or screened via a window. A window is defined as being a surface of finite dimension and arbitrary form in a bidimensional visualization space. The screen is considered as being a rectangular window in this visualization space. An arbitrary number of windows can be defined on the visualization space. These windows can be disjoint or can be partially or totally overlapping. These windows constitute zones on which are projected images contained in the image memory.

The invention concerns a virtual memory image controller. The adjective "virtual" is a reference to the fact that an image in the image memory can be projected on a window disjoint with that represented by the screen and hence be not visualized.

In what follows, we use the term "window" to signify both a finite surface of the visualization space as well as the image projected on this surface.

An initial method of multiwindowing was described at USENIX conference, Salt Lake City, 1984, by Peter Colins in the article "WINDIX-Windows for the UNIX environment." In this system, the image memory is divided into rectangular cells corresponding to 8×16 elementary image points. A page is defined as a rectangular group of cells. The contents of a page is visualized via a screen window, which establishes a correspondance between a rectangular region of the page and a rectangular region of the screen. Several windows can be created simultaneously on the screen.

Each window is defined by a set of pointers designating cells in a page of the image memory. The addressing of the image memory by the video generator delivering the video signal to the screen is hence realized via an indirection table containing the said pointers. This indirection table permits the rapid modification of an image displayed on the screen. In effect, the modification of the image displayed on a screen window is obtained without any physical movement of cells in the image memory, simply by modifying the contents of the indirection table pointers associated with this window.

This indirection table also allows a more efficient management of the image memory since the blank areas, generally important, contained in the image visualized, can be represented in the image memory by one cell designated by all the points corresponding to blank areas of the screen.

The principal drawback of this system is that the processor who accesses in modification or consultation the image memory does not use the indirection table, but rather accesses the image memory directly.

This dissymmetry is unsatisfying for it complicates the treatment of some functions. Consider, for instance, the function "scroll." To realize the scroll on a visualized image, it suffices to update the contents of pointers designating cells composing the visualized image. This can be done rapidly and necessitates no physical displacement of the contents of the image memory. On the contrary, to realize a scroll of the image memory seen from the processor, it is necessary to physically displace the contents of the memory cells. This processing is long and complex, hence inconvenient.

I am also aware of a virtual memory controller containing an image memory and an indirection table in which the said indirection table is used only by the processor. Some computers from RIDGE COMPUTERS CY have such virtual memory controllers. This shows that the use of an indirection table for read/write access to a memory is known. This indirection table forms the memory management unit implementing automatic address translation used in the majority of advanced processors.

In this circuit, the image memory accessed by the processor via the indirection table is copied into a second memory, accessible only by the video generator.

This circuit was not designed for multi-windowing. It would, incidentally, be difficult to implement. In fact, the blocks translated by the indirection mechanism are blocks of fixed length in one dimension (pages) corresponding to the use of a virtual memory managing a program memory. Each element addressed by this indirection table corresponds to a certain number of complete lines on the screen. To implement multiwindowing, a bi-dimensional division is necessary, i.e. a division where the dimensions of a block in the X and Y dimensions are less than those of a line of characters on the screen.

The circuit described in the above article presents a drawback analog to that of the preceding article, i.e. that the dissymmetry between the access modes of the processor and the video generator to the image memory does not allow a rapid and efficient management by the processor of the screen image contents.

I also know of a memory image circuit in which the addressing of the image memory is always made via an indirection table. The processor and the video generator hence access the image memory symentrically.

In this circuit, the image memory contains only the image visualized and does not allow the multi-windowing. In the case where the image has a number of lines or columns not having the form 2-n, n being an integer, a direct addressing of the memory by the processor would imply an important waste of memory.

Consider for instance an 80×25 character screen, each character having a size of 9×14 points. The screen has a resolution of 720 lines (80×9) and 350 columns (25×14). To address an image point in this screen, 10 address lines are necessary to select one of the 720 lines (26ˆ10=1024>720) and 9 address lines to select one of the 350 columns of the image (2ˆ9=350>350).

The visualization of an 80×9×25×14, or 252,000 point image, hence necessitates an image memory of 1024×512, or 524,588 points. In this particular case, direct addressing of the image memory implies a very important waste of space since more than half of the space is unused.

The sole object to the indirection table used in this circuit is for address transcoding to limit the waste of memory space. This indirection table is formed by a read-only memory (ROM) and does not allow the modification of the image visualized via an update of the table.

The present invention has a virtual memory image controller eliminating the drawback of the circuits according to the known state of the art. A first characteristic of the invention resides in a symmetric addressing of the image memory by the processor and the video generator. This permits a simplification of the management of the image memory and notably of any update of the image displayed on the screen, because of the identical addressing of the memory by the video generator and the processor.

The use of an indirection table formed from a random-access memory (RAM) is the second characteristic of the invention. This indirection table contains a sequence of pointers, each pointer designating a zone of the image memory. The possibility to update the contents of the indirection table allows, on the one hand, the processor to create multiple windows and, on the other hand, to update the windows, visible on the screen or invisible, without calling for a physical displacement of the image memory contents. This indirection table also allows a limiting of the waste of memory space when the number of lines or columns of the image is not a power of 2.

It is a specific object of the invention to provide a virtual memory image controller comprising:

- a bidimensional image memory organized in N elementary blocks, N being an integer, the said blocks being of fixed size and rectangular,
- an indirection table formed from a random access read/write memory (RAM), each pointer noting the beginning address of a block in the memory,
- a video generator delivering a video signal corresponding to the contents of n blocks (n≦n), for the display of an image composed of the said n blocks organized in a matrix, the said blocks being addressed by the video generator via the indirection table, and
- an interface for read/write access to the memory and the indirection table, the memory being addressed via indirection table.

The interface receives read/write commands from an external processor. It comprises notably a buffer for memorizing the signals delivered by the processor until the access to the image memory or the indirection table is permitted, i.e. until the end of a video generator access. It can comprise a memory management unit addressable by the processor (image memory and main memory).

According to one preferred embodiment, the n elementary blocks visualized on the screen correspond to the first n blocks of the indirection table. The video generator addresses only these n pointers. This addressing is done periodically to refresh image memory contents.

By the first n pointers of the indirection table, we mean the pointers contained in the n lowest addresses of the indirection table.

According to one preferred embodiment, the circuit of the invention also comprises address decomposing means disposed between, on one hand, the video generator and the interface, and, on the other hand, the indirection table, said means receiving the addresses delivered by the said video generator and the said interface and decomposing each address into an upper part representing the beginning address of a block in the image memory and a lower part designating the index of a word in the said block, the upper part being received by the indirection table and the lower part by the image memory.

According to one preferred embodiment, the address decomposing means disposed between, on the one hand, the video generator and the interface and, on the other hand, the indirection table comprises a first line address register and a first column address register receiving the addresses delivered by the said video generator, a second line address register and a second column address register receiving the addresses delivered by the said interface and means for concatenation of the upper parts of the address furnished by a line address register and a column address register and for concatenation of the lower parts of the address furnished by a line address register and a column address register, the address resulting from the concatenation of the upper address parts being applied to the indirection table and the address resulting from the concatenation of the lower address parts being applied to the image memory.

Figure 2:
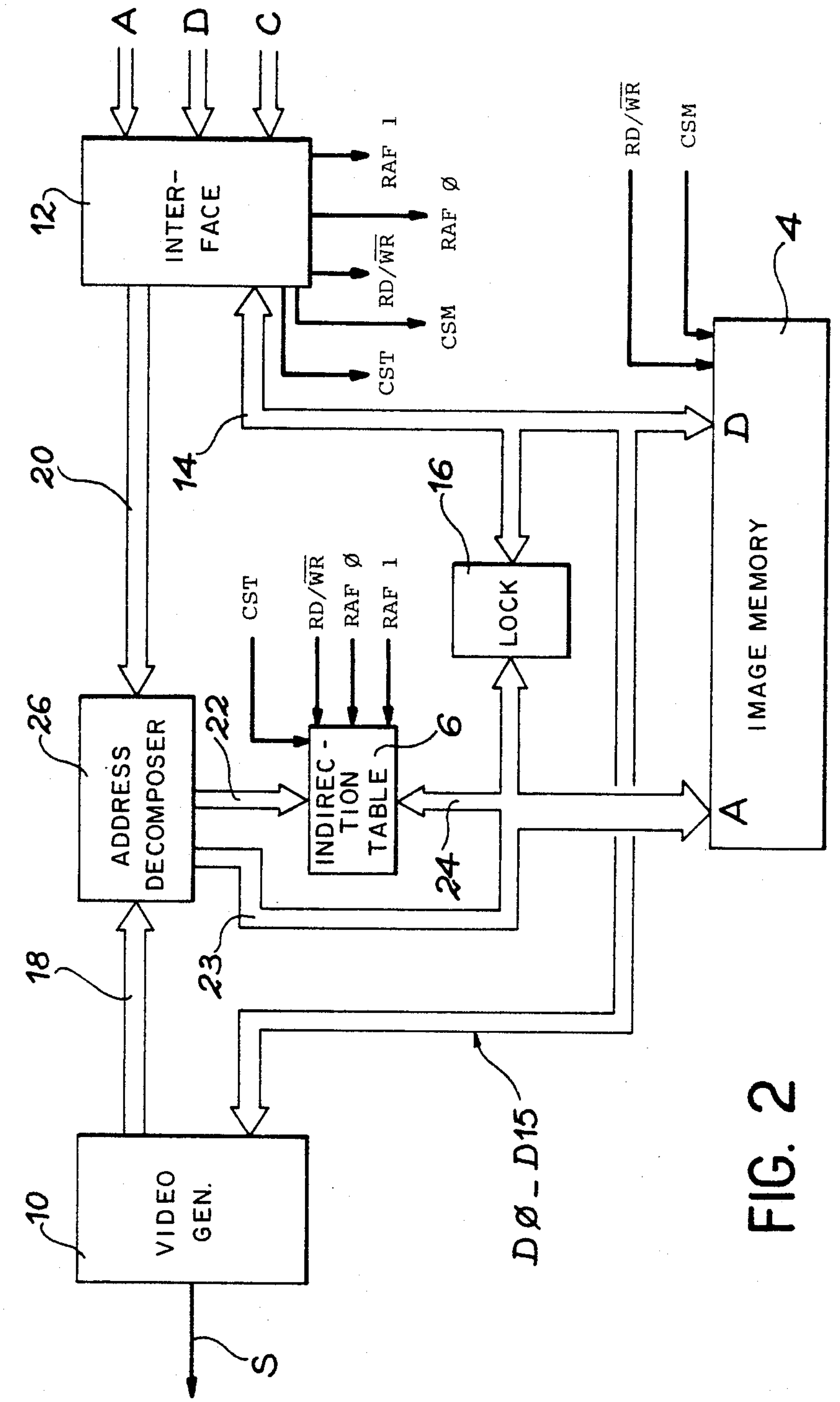
Figure 3:
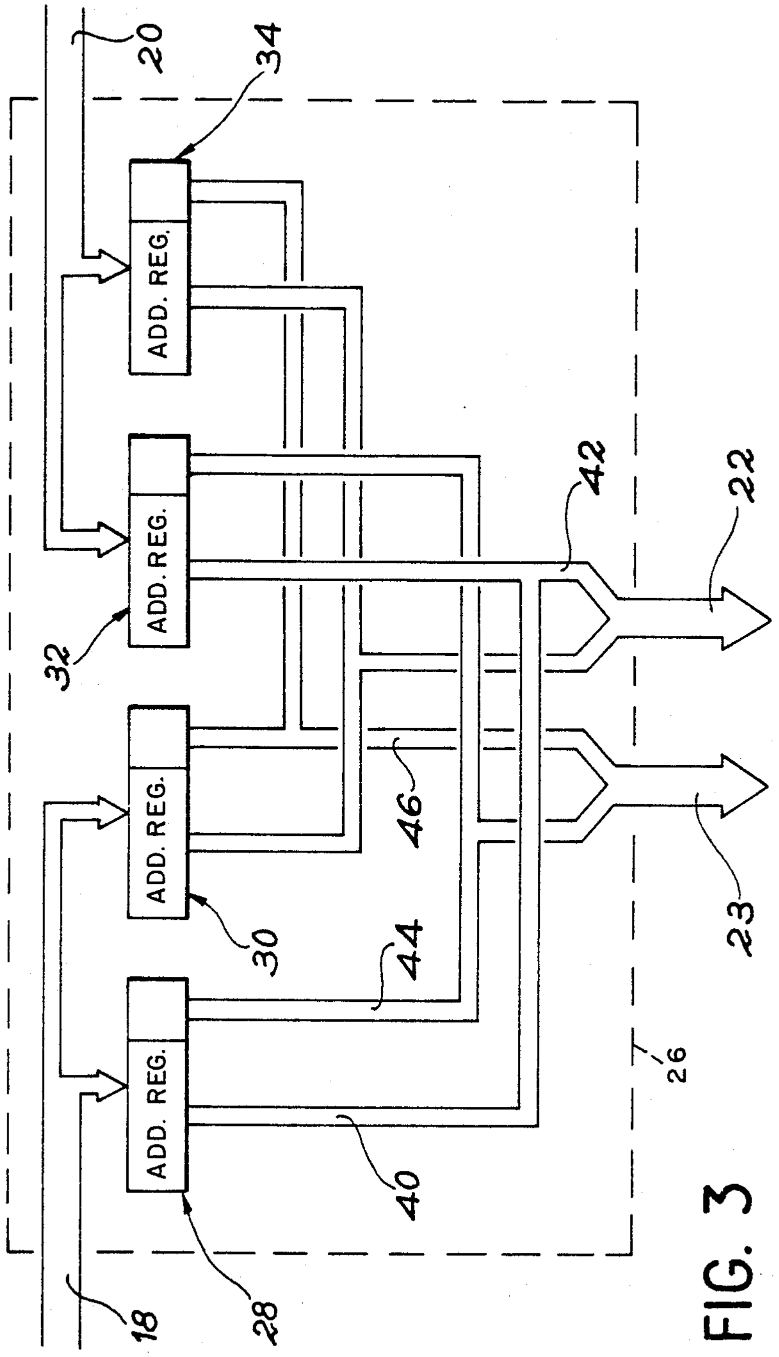

The characteristics and advantages of the invention will become more clear from the description hereinafter relative to non-limitative embodiments, and with a reference to the annexed drawings, in which:

FIG. 1 illustrates diagrammatically the correspondance between a block of the image memory and a zone of the visualization screen by the intermediary of the indirection table, FIG. 2 represents schematically an embodiment of the circuit of the invention, FIG. 3 represents schematically an embodiment of the address decomposer 26 of the circuit of FIG. 2, FIGS. 4*a*, 4*b* and 4*c* illustrate diagrammatically the formats of a virtual address delivered by the video generator, of the corresponding address delivered by the means 26, and of the address received by the image memory, respectively, FIGS. 5*a*, 5*b*, and 5*c* illustrate diagrammatically the formats of a virtual address delivered by the interface, of the corresponding address delivered by the means 26, and of the address received by the image memory, respectively, and FIGS. 6*a*, 6*b*, and 6*c* illustrate diagrammatically the multiwindowing via the means of the circuit of the invention.

The FIG. 1 illustrates the correspondence between the elementary blocks of an image memory and rectangular zones of the screen. This screen 2 is composed of n fixed size rectangular zones denoted Z1, Z2, ... Zn. The size of a zone corresponds to the size of an elementary block of the image memory.

The screen 2 is a subset of a bidimensional image space 3 made up of N fixed size rectangular zones, N≧n. The zones of this space which are invisible, i.e. which do not correspond to the screen, are used to create virtual windows. A point of the space 3 is indicated by a virtual address.

The image memory 4 is composed of a plurality of fixed size rectangular blocks 8. This image memory is bidimensional, i.e. the image memorized in an elementary block is represented in the same way as when it is visualized in a zone of the screen 2. This signifies that two elementary points on two consecutive lines of the screen having the same column address are memorized in the memory 4 in two consecutive lines and the same column of an elementary block 8.

This bidimensional structure has the advantage, as opposed to a linear addressing, of simplifying certain functions, such as the scroll of an image in a block or in a window.

The addressing of each elementary block 8 of the memory 4 is implemented by a sequence of pointers comprising the indirection table 6. Each pointer contains two address fields, designating the co-ordinates of the first word of the first line of an elementary block.

A sequence of n given pointers among the N pointers of the indirection table are associated with the zones Z1, Z2, . . . , Zn of the screen 2. These pointers are, for instance, the n initial pointers of the indirection table, in other words, the pointers corresponding to the first n addresses of this table. The other pointers indicate elementary blocks not visible on the screen. The creation, the movement or the erasure of a window on the screen is hence implemented simply by an update of the contents of the indication table.

For instance, the screen 2 can be composed of 2304 lines of 1728 image points. It can be broken down into 972 zones of 64×64 image points, i.e. 36 groups of 27 zones. The size of this image memory can be for instance, 1024K words of 16 bits each, each image point being coded on one bit. This memory is broken down into 4096 elementary blocks made up of 64 lines of 4 words. In this embodiment, the indirection table has 4096 addresses each containing a pointer designating an elementary block of the memory. The 1152 initial addresses, for instance, correspond to the elementary blocks shown on the screen. The other pointers correspond to the virtual area containing the non-visualized windows.

In FIG. 2 is represented a schematic drawing of a virtual memory image controller conforming to the invention. This circuit comprises principally the image memory 4, the indirection table 6, a video generator 10, an interface 12, and an address decomposing means 26. It also comprises a data bus 14 to which are connected the image memory 4, the video generator 10, the interface 12, and via a lock 16, the indirection table 6. Lastly, it comprises several address buses 18, 20, 22 and 24 connecting to the indirection table 6, and the indirection table 6 to the image memory 4, respectively.

In accordance with the invention, the addressing of the image memory 4 by the video generator 20 and the interface 12 passes by the intermediary of the indirection table 6.

The address decomposing means 26 receives virtual addresses delivered by the video generator 10 and the interface 12, that is to say addresses expressed according to the bidimensional visualization space. The interface 12 delivers virtual addresses designating an arbitrary image element of the display space. On the contrary, the addresses delivered by the video generator can only designate the image elements corresponding to the screen, that is to say a fixed window in the display space.

The addresses received by the means 26 are decomposed into an upper address part and a lower address part, the first designating a zone number in the display space, and the second designating a word in this zone. The upper address part is transmitted by the bus 22 to the indirection table 6 which delivers to the image memory 4 the physical block address corresponding to this zone. The lower address part is directly transmitted to the image memory 4 by the bus 23; it forms an address index in the zone and block.

I will describe an embodiment of the means 26 with reference to the FIG. 3. I will firstly indicate the operation of the circuit of the FIG. 2 in a refresh mode in which the image memory is accessed by the video generator 10, and in a processing mode, in which the image memory is accessed, in read/write cycles, by the interface 12.

In refresh mode, the video generator 10 provides successive virtual addresses whose coordinates are contained in the limits of the screen. To each virtual address corresponds, via the indirection table 6, a physical address of the image memory 4. The word contained at this address is received by the video generator 10 by way of the data bus 14. The words thus received from the image memory are then emitted as a video signal S towards a display means.

In the processing mode, the interface 12 delivers a virtual address on the data bus 20. This virtual address can designate an arbitrary word of the display space, corresponding to the screen or an invisible window.

The interface 12 can also address the indirection table 6. The selection of the image memory 4 or of the indirection table 6 is assured by the selection signals CSM or CST furnished by the interface 12.

When the image memory 4 is selected (signal CSM validated), the interface 12 can read or write in the image memory, the transmission of data being implemented by the data bus 14. When the indirection table 6 is selected (signal CST validated), the virtual address delivered by the interface 12 designates a pointer of the indirection table, the transmission of data being realized via the buses 14 and 24, the lock 16 being validated.

The modification of the contents of the indirection table 6 by the interface 12 allows the modification of the organization of windows, and notably the image visualized on the screen, very simply, without a physical displacement of data in the image memory being required. Also, since the video generator 10 and the interface 12 access the image memory symmetrically, a modification of the contents of the indirection table is transparent to the video generator.

There is indicated in FIG. 2 the principal command signals emitted by the interface 12. These are: CSM and CST to activate the image memory and the indirection table, respectively, RD/WR to indicate if the access is in read or write, RAFO and RAFI which command the replacement of the last word addressed by the video generator with the value "0" or the value "1".

The processor accesses the main memory and the image memory in the classic manner via a memory management unit. The main memory contains program and data memories; it is one-dimensional. The image memory contains image elements; it is bidimensional. The access to the two memories is hence most identical.

In the case of the main memory, the addressing by the memory management unit is direct. In the case of the image memory, the address must be rendered bidimensional. To do this, it suffices to exchange the bit numbered N,N+1, . . . , N+L+1 of the address with the bits M,M+1, . . . , M+1+1, where N,M and L are such that 2N is the next largest integer, to the length of a display line, in words, 2M is the height of a block in lines, and 21 is the length of a block in words. For instance, for 64×64 blocks and lines comprising 54 32-bit words, there results have N=5, M=6, L=1.

Two structures are hence possible, the one when the main memory and the image memory are two zones of a same memory circuit, the other when they are made from two independent circuits.

In the first case, the memory management unit is connected directly to the memory circuit and a conditional permutation means is placed between the processor and the memory management unit. This permutation means is designed to either be transparent for the addresses or to exchange the bits of the address signals as indicated above. The state of the permutation means can be commanded easily by the state of an unused bit of the virtual address. This permutation means can be implemented by two multiplexors commanded simultaneously of which the first receives the bits of order N,N+1, . . . N+L+1 on a first input and the bits M, M+1, . . . M+L+1 on a second input and of which the second receives the bits of order M, M+1, M+L+1 on a first input and the bits N,N+1, N+L+1 on a second input. The other address bits are not affected by the permutation means.

In this embodiment, the interface 12 can comprise in serial the permutation means and the memory management unit; the address bus 20 is also connected directly to the main memory.

In the second case, the memory management unit is connected by an input directly to the processor. Its address output is connected directly to the main memory and is connected to the image memory by a means operating a fixed permutation between the bits of order N,N+1, N+L+1 and the bits of order M,M+1, ..., M+L+1. This permutation means can be merely virtual, the permutation consisting only of the modification of the connections of the address bus 20 with the input pins of the means 26.

In this second embodiment, the interface 12 comprises only a memory management unit. The bus 20 is connected to the central memory without permutation to the address lines and to the means 26, for addressing the image memory, with permutation of certain address lines. FIG. 3 illustrates a particular embodiment of the means 26. This embodiment comprises two address registers 28 and 30 receiving the virtual line and column addresses delivered by the video generator 10, and two address registers 32 and 34 receiving the virtual line and column address registers delivered by the interface 12. The addresses received by each register contain upper and lower parts.

The upper parts of the line addresses are delivered from the register 28 or the register 32 on a data bus 40. In the same way, the upper parts of the column addresses are delivered by the register 30 or the register 34 on a data bus 42. The addresses present on these busses 40, 42 are concatenated to form an access address to the indirection table 6. The address bus 22 results from the juxtaposition of the address buses 40 and 42.

In the same way, the lower address line parts are delivered from the registers 28 and 32 on an address bus 44, and the lower column address parts are delivered from the registers 30 and 34 on an address bus 46. These lower line and column address parts form an index designating a word in the elementary memory blocks selected by the upper address line and column parts. the bus 23 delivering this index to the image memory 4 results from the juxtaposition of the address buses 44,46.

I have represented on the FIGS. 4a to 4c and 5a to 5c the formats of the addresses delivered by the interface and the video generator, respectively.

As an example, consider an image memory of 4 megabytes organized in 32 bit words. This memory is broken down into blocks of 128×128 bits; a block is hence organized in 128 4-word lines. The screen has a resolution of 2304 lines by 1728 image points. The image displayed on the screen is hence composed of 2304/128=18 groups of 1728/128=13.5, i.e. 14 blocks.

The FIGS. 4a, 4b and 4c illustrate the format of the address delivered by the video generator and the addresses received by the indirection table and the image memory, respectively.

The address delivered by the video generator contains 4 fields, a field PY indicating a block group number, a field INDY indicating a line number in a block, a field PX indicating a block number in a block group, and a field INDX indicating a word number in a block line.

The fields PY and INDY are received by the register 28 and the fields PX and INDX by the register 30. The fields INDY and INDX contain 7 bits (for 128 lines) and 2 bites (for 4 words per line), respectively. Among these, only the 5 least-significant bits of PY are used to address one of the 18 block groups of the screen. The 4 least significant bits of PX are used to address one of the 14 blocks in a block group of the screen.

The fields PX and PY are concatenated to form a selection address in the indirection table. The contents of this address is concatenated with the fields INDY and INDX to form the physical address at M of a word of the image memory (FIG. 4c).

The address delivered by the interface is decomposed into 4 fields as is the address delivered by the video generator. These 4 fields represented in FIG. 5a are identical to those of FIG. 4, the only difference being that the three most significant bits of PY are not necessarily zero. In the case where they are zero, the address delivered by the interface is an address corresponding to a word displayed on the screen. More precisely, when the three most significant bits of PY are zero, the interface accesses one of the 'n' initial addresses of the indirection table, i.e. one of the blocks projected onto the screen. If any of these three bits in non-zero, the address delivered by the interface corresponds to an arbitrary memory address. This word can be displayed on the screen since the indirection table is not being used in a bijective manner, a pointer in one of the first 'n' addresses and a pointer in another address can designate the same block. For the interface, that is to say for the processor, all the windows are virtual; during the access, it is not known whether all or part of the window being addressed is visible or not. In general, the access to the 'n' initial addresses of the indirection table is only made during an update of the organization of a window (i.e. scroll) or after the reorganization of the presentation of the windows on the screen.

The fields PY and INDY are received in the address register 32 and the fields PX and INDX in the register 34. The fields PX and INDX are regrouped (FIG. 5b) to form an access address to the indirection table. The contents of this address are concatenated with the fields INDY and INDX to form the physical address at M of a word in the image memory (FIG. 5c).

The circuit of the invention permits the creation, modification or erasure of windows on the screen very easily. I have represented in FIG. 6a the image memory 4 of the circuit of the invention. This memory comprises three windows 48, 50 and 52.

The window 48 represents the image displayed on the screen. This window is composed of n fixed size rectangular blocks of the image memory, each block being indicated by a pointer of the indirection table. The blocks displayed on the screen, are, for instance, those designated by the n initial pointers of the indirection table.

The windows 50 and 52 are also composed of a plurality of fixed sizes rectangular blocks of the image memory, each block being indicated by pointer of the indirection table.

If these pointers are not among the first n pointers of the indirection table, the windows 50 and 52 are not displayed on the screen. Only the window 48 is visible. This is the case represented on the FIG. *6b.*

On the other hand, if the contents of the n initial addresses of the indirection table is modified such that certain of these pointers designate the zones of image memory forming the windows 50 and 52, these windows appear on the screen. This is the case represented on the FIG. *6c.*

Note that in this case, a window can be represented with a different form in the image memory and the screen. In effect, each window is composed of independent rectangular blocks each associated with a pointer. Each block of a window can hence be projected on the screen independently of the other blocks of the window. A window made of contiguous blocks of the image memory can hence appear as disjointed zones of the screen and inversely, a plurality of disjointed zones of the image memory can be visualized on the screen as a rectangle.

What is claimed is:

1. Virtual memory controller comprising:

- a bidimensional image memory (4) organized in N elementary blocks, N being an integer, the said blocks being of fixed size and rectangular,
- an indirection table (6) constituted by a random access read/write memory containing a sequence of N pointers, each pointer indicating the beginning address of a block in the image memory,
- a divider address,
- a video generator (10) delivering a video signal corresponding to the contents of n blocks of the image memory, where $n \leqq N$, for the display on a screen of an image composed of the n blocks organized in a matrix, the addressing of said blocks being made by the video generator via the indirection table,
- an interface (12) to access in read/write to the image memory and the indirection table, the addressing of the memory being made via the divider address and via the indirection table,
- an address bus which permits the addressing by the video generator via the divider address and via the indirection table of the image memory,
- an address bus which permits the addressing by the interface via the divider address and via the indirection table of the image memory, and
- a bidirectional data bus which is common to the interface, the video generator and the image memory.

2. The controller according to claim 1, characterized in that said indirection table includes n initial pointers in said read/write memory and the n blocks displayed on the screen are those indicated by the n initial pointers of the indirection table.

3. The controller according to claim 2, characterized in that it also comprises address decomposing means (26) placed between, on one hand, the video generator (10) and the interface (12) and, on the other hand, the indirection table (6), said means receiving the addresses delivered by said video generator and said interface and decomposing each address into an upper part representing the beginning of a block in the image memory and a lower part representing an index designating a word in said block, the upper part of the address being received by the indirection table and the lower part by the image memory.

4. The controller according to claim 3, characterized in that said address decomposing means (26) comprises a first line address register (28) and a first column address register (30) receiving the address delivered by the video generator, a second line address register (32) and a second column address register (34) receiving the addresses delivered by said interface, and means (40, 42, 44, 46) for concatenating the upper address parts delivered by a line address register and a column address register, the address resulting from the concatenation of the upper address parts being applied to the indirection table and the address resulting from the concatenation of the lower address parts being applied to the image memory.

5. The controller according to claim 1 in which the interface (12) receives a one-dimensional address signal from the processor characterized in that the interface (12) comprises in serial a conditional permutation means and a memory management unit, said permutation means being commanded to permute the bits in order to render said address bidimensional when it is destined for the image memory.

6. The controller according to claim 1 in which the interface (12) receives an uni-dimensional address signal from the processor characterized in that the interface (12) comprises a memory management unit, the said interface delivering on the address bus a bidimensional address by permutation of address lines.

* * * * *